(12) United States Patent
Okada et al.

(10) Patent No.: US 9,577,709 B2
(45) Date of Patent: Feb. 21, 2017

(54) COMMUNICATION SYSTEM AND COMMUNICATION DEVICE

(75) Inventors: Ryou Okada, Osaka (JP); Takeshi Hagihara, Osaka (JP); Yutaka Komatsu, Osaka (JP); Tatsuya Izumi, Osaka (JP); Kazuhiko Nii, Osaka (JP); Yousuke Takata, Osaka (JP); Hiroya Andoh, Toyota (JP); Yuta Ochiai, Toyota (JP); Ryuichi Kamaga, Toyota (JP); Atsushi Iwai, Toyota (JP); Yukihiro Miyashita, Toyota (JP); Nobuyuki Nakagawa, Toyota (JP)

(73) Assignees: SUMITOMO ELECTRIC INDUSTRIES, LTD., Osaka (JP); SUMITOMO WIRING SYSTEMS, LTD., Mie (JP); AUTONETWORKS TECHNOLOGIES, LTD., Mie (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 139 days.

(21) Appl. No.: 14/232,202

(22) PCT Filed: Jul. 13, 2012

(86) PCT No.: PCT/JP2012/067895
§ 371 (c)(1),
(2), (4) Date: Feb. 10, 2014

(87) PCT Pub. No.: WO2013/008903
PCT Pub. Date: Jan. 17, 2013

(65) Prior Publication Data
US 2014/0192910 A1    Jul. 10, 2014

(30) Foreign Application Priority Data
Jul. 13, 2011    (JP) ................ 2011-155221

(51) Int. Cl.
H04K 1/10   (2006.01)
H01F 27/42  (2006.01)
(Continued)

(52) U.S. Cl.
CPC ............ *H04B 3/54* (2013.01); *B60L 11/1812* (2013.01); *B60L 11/1818* (2013.01);
(Continued)

(58) Field of Classification Search
CPC ............ H04B 3/542; H04B 3/46; H04B 3/32; H04B 7/0413; H04B 1/04
(Continued)

(56) References Cited

U.S. PATENT DOCUMENTS 2,634,334 A    4/1953  Kalb
5,686,806 A   11/1997  Hibbard
(Continued)

FOREIGN PATENT DOCUMENTS

CN    101099302 A    1/2008
CN    101803143 A    8/2010
(Continued)

OTHER PUBLICATIONS

SAE International (Society of Automotive Engineers International), "Surface Vehicle Recommended Practice," Jan. 2010.
(Continued)

*Primary Examiner* — Daniel Washburn
*Assistant Examiner* — Sarah Hassan
(74) *Attorney, Agent, or Firm* — McDermott Will & Emery LLP

(57) ABSTRACT

An output circuit sends out, to an input circuit, a control pilot signal generated by a voltage source. A voltage transformer is provided to a control pilot line on the output side of the output circuit, and a communication unit transmits and receives communication signals via the voltage transformer.
(Continued)

A voltage transformer is provided to the control pilot line on the input side of the input circuit, and a communication unit transmits and receives the communication signals via the voltage transformer. A low-pass filter is provided to the control pilot line between the input circuit and the voltage transformer.

14 Claims, 4 Drawing Sheets

(51) Int. Cl.
| | |
|---|---|
| H04B 3/54 | (2006.01) |
| H01F 38/14 | (2006.01) |
| B60L 11/18 | (2006.01) |
| H02J 7/00 | (2006.01) |

(52) U.S. Cl.
  CPC ....... B60L 11/1824 (2013.01); B60L 11/1846 (2013.01); B60L 11/1861 (2013.01); H01F 38/14 (2013.01); H02J 7/0004 (2013.01); H04B 3/548 (2013.01); B60L 2210/30 (2013.01); B60L 2240/527 (2013.01); B60L 2270/147 (2013.01); H04B 2203/547 (2013.01); H04B 2203/5416 (2013.01); Y02T 10/705 (2013.01); Y02T 10/7005 (2013.01); Y02T 10/7044 (2013.01); Y02T 10/7072 (2013.01); Y02T 10/7241 (2013.01); Y02T 90/121 (2013.01); Y02T 90/127 (2013.01); Y02T 90/128 (2013.01); Y02T 90/14 (2013.01); Y02T 90/16 (2013.01); Y02T 90/163 (2013.01); Y02T 90/169 (2013.01); Y04S 30/14 (2013.01)

(58) Field of Classification Search
  USPC .......................................... 375/260; 307/104
  See application file for complete search history.

(56) References Cited

U.S. PATENT DOCUMENTS

| | | | |
|---|---|---|---|
| 6,019,779 A | 2/2000 | Thorud et al. | |
| 6,091,779 A | 7/2000 | Griessbach | |
| 6,181,177 B1* | 1/2001 | Chapman | G11B 7/005 327/172 |
| 6,278,103 B1 | 8/2001 | Takami | |
| 6,278,357 B1 | 8/2001 | Croushore et al. | |
| 6,285,744 B1 | 9/2001 | Nero, Jr. et al. | |
| 6,339,204 B1* | 1/2002 | Kato | B23K 11/3063 219/86.24 |
| 6,559,560 B1* | 5/2003 | Jin | H01F 38/14 307/104 |
| 9,197,290 B2 | 11/2015 | Komatsu et al. | |
| 2001/0002791 A1* | 6/2001 | Tsuge | G01P 3/487 324/174 |
| 2002/0057164 A1* | 5/2002 | Jin | H01F 38/14 336/115 |
| 2002/0171535 A1 | 11/2002 | Cern | |
| 2003/0063900 A1* | 4/2003 | Wang | H02P 29/02 388/806 |
| 2003/0076221 A1 | 4/2003 | Akiyama et al. | |
| 2003/0095036 A1 | 5/2003 | Wasaki et al. | |
| 2004/0238495 A1* | 12/2004 | Byerly | B21C 47/20 219/56 |
| 2005/0251369 A1* | 11/2005 | DeCarlo | G01L 23/085 702/190 |
| 2006/0119573 A1* | 6/2006 | Grant | G06F 3/016 345/156 |
| 2006/0160488 A1* | 7/2006 | Sueoka | G06K 19/0707 455/41.2 |
| 2006/0170285 A1 | 8/2006 | Morimitsu et al. | |
| 2006/0192537 A1 | 8/2006 | Hagen et al. | |
| 2006/0232095 A1* | 10/2006 | Sedighzadeh | B60J 11/02 296/98 |
| 2007/0017691 A1* | 1/2007 | Izumida | H01B 7/0009 174/110 R |
| 2007/0076666 A1 | 4/2007 | Riveiro et al. | |
| 2007/0201542 A1 | 8/2007 | Hertel et al. | |
| 2008/0175028 A1* | 7/2008 | Stefanutti | H02M 7/483 363/67 |
| 2009/0102433 A1 | 4/2009 | Kamaga | |
| 2009/0255742 A1* | 10/2009 | Hansen | B60K 7/0007 180/65.31 |
| 2009/0280757 A1 | 11/2009 | Zhu et al. | |
| 2010/0303263 A1 | 12/2010 | Hiensch | |
| 2011/0127956 A1 | 6/2011 | Mitsutani | |
| 2011/0134976 A1 | 6/2011 | Fossion et al. | |
| 2011/0207358 A1 | 8/2011 | Ichikawa et al. | |
| 2012/0001494 A1* | 1/2012 | Urano | H02J 5/005 307/104 |
| 2012/0002714 A1 | 1/2012 | Varadarajan et al. | |
| 2012/0029728 A1* | 2/2012 | Hirayama | B60L 11/1838 701/1 |
| 2013/0154362 A1 | 6/2013 | Takaka et al. | |
| 2014/0192910 A1 | 7/2014 | Okada et al. | |
| 2014/0247893 A1 | 9/2014 | Komatsu et al. | |
| 2014/0254694 A1 | 9/2014 | Okada et al. | |
| 2014/0292069 A1 | 10/2014 | Hagihara et al. | |

FOREIGN PATENT DOCUMENTS

| | | |
|---|---|---|
| JP | 55-66459 | 5/1980 |
| JP | 61-136327 | 6/1986 |
| JP | 2003-218754 A | 7/2003 |
| JP | 2004-304365 A | 10/2004 |
| JP | 2004-532562 A | 10/2004 |
| JP | 2007-013812 A | 1/2007 |
| JP | 2009-106053 A | 5/2009 |
| JP | 2010-123284 A | 6/2010 |
| JP | 2011-109821 A | 6/2011 |
| JP | 2011-172363 A | 9/2011 |
| JP | 2012-034484 A | 2/2012 |
| JP | 2012-151824 A | 8/2012 |
| JP | 2013-038760 A | 2/2013 |
| KR | 10-2009-0066385 A | 6/2009 |
| KR | 10-2009-0110789 A | 10/2009 |
| WO | 02-080396 A1 | 10/2002 |
| WO | 2010/055379 A2 | 5/2010 |
| WO | 2012/176832 A1 | 12/2012 |
| WO | 2012/176833 A1 | 12/2012 |
| WO | 2013/008921 A1 | 1/2013 |
| WO | 2013/008922 A1 | 1/2013 |
| WO | 2013008903 A1 | 1/2013 |

OTHER PUBLICATIONS

P. Van Den Bossche, et al., "Trends and Development Status of IEC Global Electric Vehicle Standards," Journal of Asian Electric Vehicle, Dec. 2010, vol. 8, No. 2, pp. 1409-1414, [retrieval date Jul. 13, 2012], Internet: <URL:http://www.union-services.com/aevs/1409-1414.pdf>.
International Search Report of PCT/JP2012/067965 Dated Aug. 21, 2012.
SAE International (Society of Automotive Engineers International), "Surface Vehicle Recommended Practice," J2931/4 Jul. 2012.
USPTO. Oct. 26, 2015. Supplemental Notice of Allowability issued in U.S. Appl. No. 14/128,528, filed May 1, 2014 (now U.S. Pat. No. 9,197,290, issued Nov. 24, 2015).
Bleijs, C. 2009. Low-cost charging systems with full communication capability. In EVS24, International Battery, Hybrid and Full Cell Electric Vehicle Symposium, Stavanger, Norway, May 13-16, 2009, 9 pages.
Mannan, M.A. et al. 2009. Power Line Communication Over Feeder Cables in an Industrial Environment. IEEE International Symposium on Power Line Communications and Its Applications, 2009, ISPLC, Mar. 29, 2009, pp. 255-260.

(56) References Cited

OTHER PUBLICATIONS

Granado, J. et al. 2010. Modeling Airfield Ground Lighting Systems for Narrowband Power-Line Communications. IEEE Transactions on Power Delivery, vol. 25, No. 4, Oct. 2010.
ISA/JP, International Search Report, dated Jul. 24, 2012, issued in International Patent Application No. PCT/JP2012/065845 (English translation thereof).
ISA/JP, International Search Report, dated Jul. 24, 2012, issued in International Patent Application No. PCT/JP2012/065847 (English translation thereof).
ISA/JP, International Search Report, dated Aug. 21, 2012, issued in International Patent Application No. PCT/JP2012/067895 (English translation thereof).
ISA/JP, International Search Report, dated Aug. 21, 2012, issued in International Patent Application No. PCT/JP2012/067960 (English translation thereof).
European Patent Office. 2014. Extended European Search Report, dated Nov. 24, 2014, for EP Application No. 12801935.3.
USPTO, Office Action, dated Mar. 25, 2015, for U.S. Appl. No. 14/128,528.
State Intellectual Property Office of PRC, Notification of Second Office Action, dated May 25, 2015, for Chinese Patent Application 201280033956.0.
USPTO, Notice of Allowance, dated Jul. 21, 2015, for U.S. Appl. No. 14/128,528.
USPTO, Office Action, dated Sep. 17, 2015, for U.S. Appl. No. 14/128,517.
Japan Patent Office. Office Action for Japanese Patent Application 2013-523992, dated Sep. 29, 2015.
USPTO. Jan. 14, 2016. Final Office Action issued in U.S. Appl. No. 14/128,517, filed May 7, 2014.
USPTO. Feb. 25, 2016. Non-Final Office Action issued in U.S. Appl. No. 14/232,218, filed May 28, 2014.
Supplementary European Search Report EP Application No. 12812102.7 dated Jun. 14, 2016.
SAE EV Charging Systems Committee: "SAE J1772", Oct. 30, 1996, XP002758454 http://arb.ca.gov/msprog/zevprog/stakeholders/infrastructure/finasaej1772.doc retrieved May 2, 2016—30 pgs.
Office Action U.S. Appl. No. 14/128,517 dated Jun. 13, 2016.
Non-Final Office Action U.S. Appl. No. 14/232,218 dated Sep. 12, 2016.
Final Office Action U.S. Appl. No. 14/128,517 dated Nov. 30, 2016.

\* cited by examiner

F I G. 2
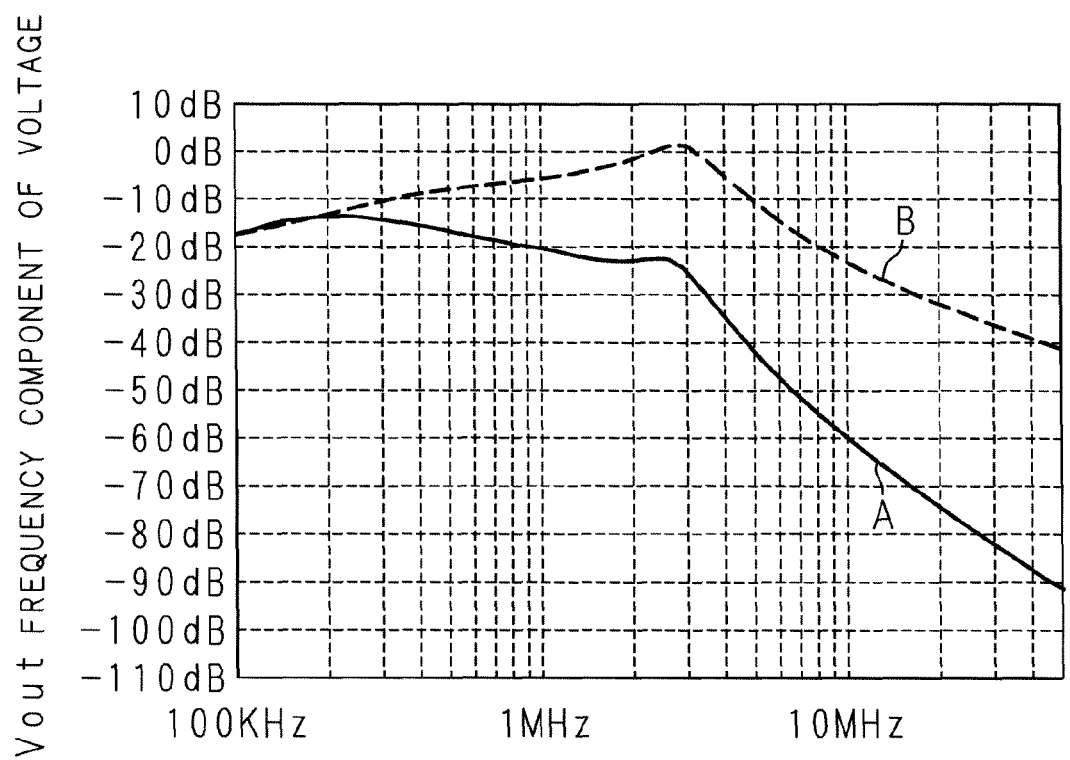

COMMUNICATION SYSTEM AND COMMUNICATION DEVICE

CROSS-REFERENCE TO RELATED APPLICATIONS

This application is the national phase under 35 U.S.C. §371 of PCT International Application No. PCT/JP2012/067895 which has an International filing date of Jul. 13, 2012 and designated the United States of America.

BACKGROUND

Technical Field

The present invention relates to a communication system for performing communication between a vehicle such as an electric vehicle or a hybrid vehicle and a power feeding device for feeding power to the vehicle, and to a communication device constituting the communication system.

Description of Related Art

In recent years, environmental technology has increasingly attracted attentions as a technique for addressing global warming. Such environmental technology includes, for example, an electric vehicle or a hybrid vehicle, which has been put into practical use, with a motor employed as a drive unit instead of a conventional engine consuming gasoline.

A vehicle such as an electric vehicle or a hybrid vehicle described above has a structure in which a charge plug connected to an external power feeding device is further connected to a connector at a power feeding port provided on a vehicle so that a secondary battery may be charged from the outside of the vehicle.

An interface between a vehicle and a power feeding device (charging station) in feeding power to the vehicle has already been standardized. For example, a signal line called a control pilot line is provided between an output circuit located on the power feeding device side and an input circuit located on the vehicle side, a rectangular wave signal (control pilot signal) of a predetermined frequency is output from the output circuit to the input circuit, and a voltage level at a predetermined portion of the input circuit is changed, allowing both the power feeding device and the vehicle to recognize information on the charge state of the vehicle and the like (see SAE International (Society of Automotive Engineers International), SURFACE VEHICLE RECOMMENDED PRACTICE, 2010-01).

Meanwhile, such a communication system has also been discussed that is able to further perform transmission and reception of various kinds of information between the power feeding device and the vehicle by superimposing a communication signal onto a control pilot line.

SUMMARY

When, however, a communication signal of in-band communication is superimposed onto a control pilot line, a voltage based on the communication signal is superimposed onto the control pilot line, which makes the superimposed voltage come into an output circuit and an input circuit. This causes a problem in that the voltage level at a predetermined portion of the input circuit changes and thus the function of recognizing the charge state between the power feeding device and the vehicle using the output circuit and the input circuit is lost.

The present invention has been made in view of the above circumstances. An object of the invention is to provide a communication system that can prevent the loss of the function of recognizing the state between a power feeding device and a vehicle using an output circuit and an input circuit, even in the case where a communication signal of in-band communication is superimposed onto a control pilot line, and to provide a communication device constituting the communication system.

A communication system according to the first aspect of the invention including an output circuit provided in a power feeding device for feeding power to a vehicle and outputting a rectangular wave signal of a predetermined frequency, and an input circuit provided in the vehicle and connected with the output circuit through a plurality of signal lines, the rectangular wave signal output by the output circuit being input to the input circuit, the communication system performing communication between the vehicle and the power feeding device by superimposing a communication signal onto the signal lines, is characterized by comprising: a first communication unit provided in the vehicle and performing transmission and reception of a communication signal through a first voltage transformer interposed in a midway of the signal line; a second communication unit provided in the power feeding device and performing transmission and reception of a communication signal through a second voltage transformer interposed in a midway of the signal line; and a first low pass filter interposed between the input circuit and the first voltage transformer.

The communication system according to the second aspect of the invention is, in the first aspect of the invention, characterized by further comprising a second low pass filter interposed between the output circuit and the second voltage transformer.

The communication system according to the third aspect of the invention is characterized in that, in the first and second aspects of the invention, the first low pass filter includes: a first inductor connected in series with the signal line; and a capacitor connected between signal lines between the first inductor and the first voltage transformer, and the second low pass filter includes: a second inductor connected in series with the signal line; and a capacitor connected between signal lines between the second inductor and the second voltage transformer.

The communication system according to the fourth aspect of the invention is characterized in that, in the third aspect of the invention, the first low pass filter includes a resistance connected in parallel with the first inductor, and the second low pass filter includes a resistance connected in parallel with the second inductor.

The communication system according to the fifth aspect of the invention is characterized in that, in the third aspect of the invention, the first low pass filter includes a resistance connected in series with the first inductor, and the second low pass filter includes a resistance connected in series with the second inductor.

The communication system according to the sixth aspect of the invention is characterized in that, in the third aspect of the invention, each of the first and second low pass filters includes a resistance connected in series with a capacitor.

A communication device according to the seventh aspect of the invention, including an output circuit outputting a rectangular wave signal of a predetermined frequency through a plurality of signal lines, is characterized by comprising: a communication unit performing transmission and reception of a communication signal by superimposing a communication signal onto the signal lines through a voltage transformer interposed in a midway of the signal line; and a low pass filter interposed between the output circuit and the voltage transformer.

The communication device according to the eighth aspect of the invention is, in the seventh aspect of the invention, characterized by comprising: a generation unit generating the rectangular wave signal; a voltage detection unit detecting an output voltage of the output circuit; and an adjustment unit adjusting a rectangular wave signal generated by the generation unit in accordance with the voltage detected by the voltage detection unit.

A communication device according to the ninth aspect of the invention, including an input circuit to which a rectangular wave signal of a predetermined frequency is input through a plurality of signal lines, is characterized by comprising: a communication unit performing transmission and reception of a communication signal by superimposing a communication signal onto the signal lines through a voltage transformer interposed in a midway of the signal line; and a low pass filter interposed between the input circuit and the voltage transformer.

The communication device according to the tenth aspect of the invention is, in the ninth aspect of the invention, characterized by further comprising: a resistance unit having a plurality of resistances and capable of adjusting a resistance value of each of the resistances; and an adjustment unit adjusting a resistance value of the resistance unit so as to change a voltage of the resistance unit.

In the first, seventh and ninth aspects of the invention, the first communication unit is installed in a vehicle, and performs transmission and reception of communication signals by superimposing communication signals onto signal lines through the first voltage transformer interposed in the midway of a signal line (control pilot line, for example) between an output circuit and an input circuit. The second communication unit is installed in a power feeding device, and performs transmission and reception of communication signals by superimposing communication signals onto signal lines through the second voltage transformer interposed in the midway of a signal line between an output circuit and an input circuit. In other words, the first and second communication units perform communication by connecting a voltage transformer onto a signal line and superimposing a voltage in series with the signal line. The communication band used by the first and second communication units may be in the range of, for example, 2 to 30 MHz (Home Plug Green PHY, for example). It is however not limited to the above, and may also be in the range of 150 kHz to 450 kHZ (low-speed PLC) or 1.75 MHz to 1.8 MHz (FSK: frequency shift keying).

The first low-pass filter is interposed between the input circuit and the first voltage transformer. The first low-pass filter is a filter allowing rectangular wave signals of a predetermined frequency (1 kHz, for example) output by the output circuit to pass through, while not allowing communication signals (2 to 30 MHz, for example) transmitted and received by the first and second communication units to pass through. By placing the first low pass filter between the first communication unit and the input circuit, the communication signals transmitted from the first communication unit to the second communication unit is blocked at the first low pass filter without entering the input circuit. Furthermore, the communication signal transmitted from the second communication unit to the first communication unit is blocked by the first low pass filter without entering the input circuit. Accordingly, the voltage level at a predetermined portion of the input circuit is not changed due to the communication signals transmitted and received between the first and second communication units, thereby preventing the loss of the function of recognizing the state between a power feeding device and a vehicle, using the output circuit and the input circuit.

In the second aspect of the invention, the second low pass filter is interposed between the output circuit and the second voltage transformer. The second low pass filter is a filter allowing rectangular wave signals of a predetermined frequency (1 kHz, for example) output by the output circuit to pass through while not allowing the communication signals (2 to 30 MHz, for example) transmitted and received by the first and second communication units to pass through. By placing the second low pass filter between the second communication unit and the output circuit, the communication signals transmitted by the first communication unit to the second communication unit is blocked by the second low pass filter without entering the output circuit. Moreover, the communication signals transmitted by the second communication unit to the first communication unit is blocked by the second low pass filter without entering the output circuit. Accordingly, the voltage level of the rectangular wave signal sent out by the output circuit is not changed due to the communication signals transmitted and received between the first and second communication units, thereby preventing the loss of the function of recognizing the state between the power feeding device and the vehicle using the output circuit and the input circuit.

In the third aspect of the invention, the first low pass filter includes the first inductor connected in series to the signal line, and a capacitor between the signal lines between the first inductor and the first voltage transformer. Furthermore, the second low pass filter includes the second inductor connected in series with the signal line and a capacitor between the signal lines between the second inductor and the second voltage transformer. For a predetermined frequency (1 kHz, for example) of a rectangular wave output by the output circuit, the first and second inductors have low impedance, and have high impedance for the communication signals (2 to 30 MHz, for example) transmitted and received by the first and second communication units. For a predetermined frequency (1 kHz, for example) of a rectangular wave output by the output circuit, the capacitor between the signal lines has high impedance, and has low impedance for the communication signals (2 to 30 MHz, for example) transmitted and received by the first and second communication units. Accordingly, with a simple configuration, the communication signals transmitted and received by the first and second communication units are blocked, while a control pilot signal may be passed through.

In the fourth aspect of the invention, the first low pass filter includes a resistance connected in parallel with the first inductor. The second low pass filter includes a resistance connected in parallel with the second inductor. The resistances allow, for example, the Q factor (Quality factor) representing the sharpness of the peak in oscillation of the oscillation circuit formed between the inductors and the capacitor present in the output circuit or input circuit to be smaller, suppressing unnecessary oscillation.

In the fifth aspect of the invention, the first low pass filter includes a resistance connected in series with the first inductor, and the second low pass filter includes a resistance connected in series with the second inductor. The resistances allow, for example, the Q factor (Quality factor) representing the sharpness of the peak in oscillation of the oscillation circuit formed between the inductors and the capacitor present in the output circuit or input circuit to be smaller, suppressing unnecessary oscillation.

In the sixth aspect of the invention, the first low pass filter includes a serial circuit of a capacitor and a resistance between the signal lines between the first inductor and the first voltage transformer, and the second low pass filter includes a serial circuit of a capacitor and a resistance between the signal lines between the second inductor and the second voltage transformer. The capacitor between the signal lines has high impedance for a predetermined frequency (1 kHz, for example) of a rectangular wave output by the output circuit, and has low impedance for communication signals (2 to 30 MHz, for example) transmitted and received by the first and second communication units. Accordingly, with a simple configuration, the communication signals transmitted and received by the first and second communication units are blocked while a control pilot signal may be passed through.

In the eighth aspect of the invention, the communication device includes a generation unit generating a rectangular wave signal (control pilot signal), a voltage detection unit detecting a voltage output from an output circuit and an adjustment unit adjusting a rectangular wave signal generated by the generation unit in accordance with the voltage detected by the voltage detection unit. The rectangular wave signal is a signal with the duty ratio changeable from 0 to 100% and includes, for example, a constant voltage of ±12V. This allows the output circuit to output a desired control pilot signal.

In the tenth aspect of the invention, the communication device has a resistance unit having a plurality of resistances and capable of adjusting a resistance value, and an adjustment unit adjusting a resistance value in the resistance unit for changing a voltage of the resistance unit. Thus, in accordance with the state of a vehicle, the resistance value of the resistance unit may be adjusted and the voltage of the resistance unit may be changed to a desired value.

According to the present invention, the voltage level at a predetermined portion of an input circuit is not changed due to communication signals transmitted and received between the first and second communication units, so that the function of recognizing the state between a power feeding device and a vehicle using an output circuit and the input circuit can be prevented from being lost.

The above and further objects and features of the invention will more fully be apparent from the following detailed description with accompanying drawings.

BRIEF DESCRIPTION OF THE SEVERAL VIEWS OF THE DRAWING

FIG. 2 is an explanatory view illustrating effects on an input circuit by communication signals between communication units according to Embodiment 1;

DETAILED DESCRIPTION

Embodiment 1

Figure 1:
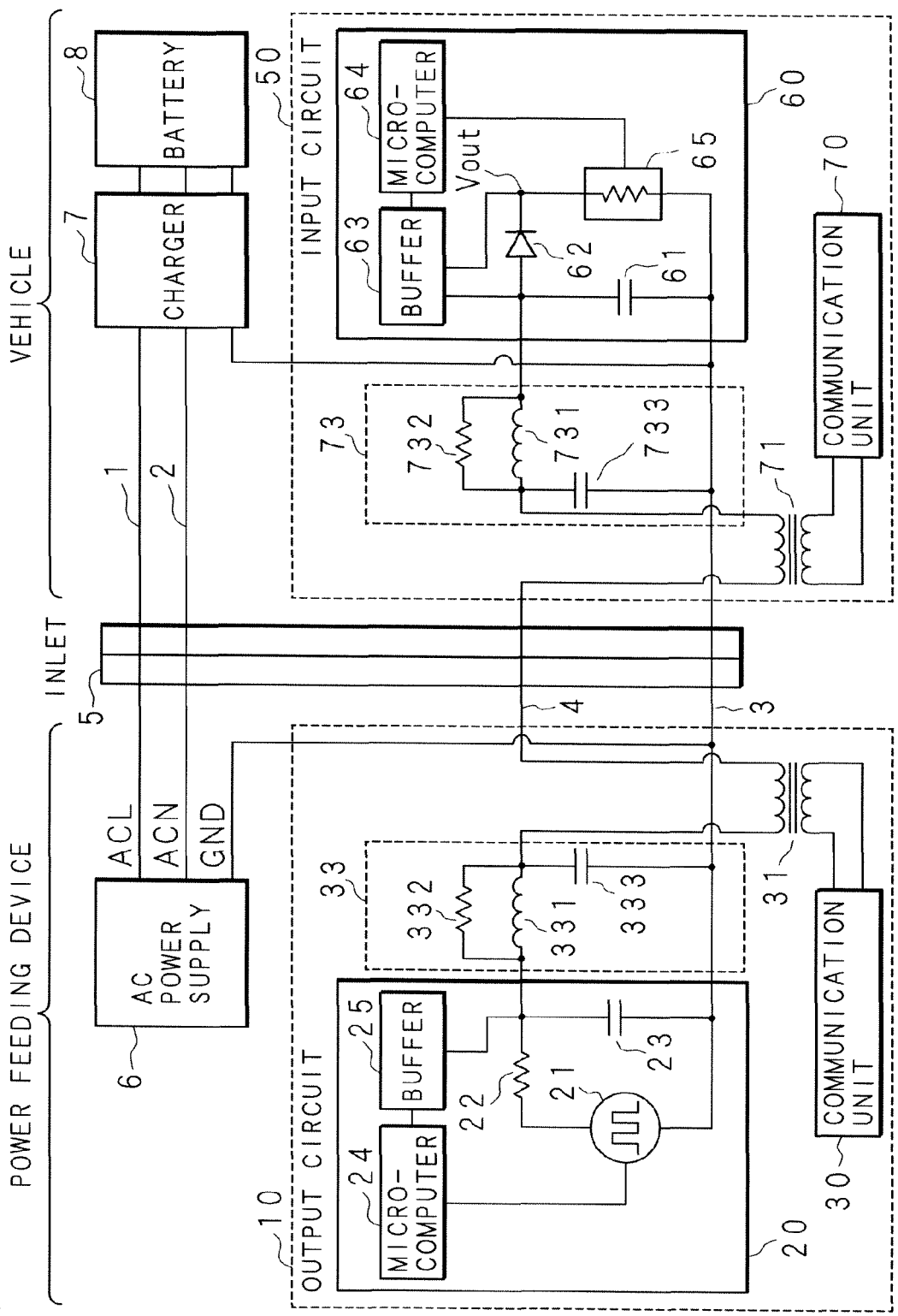
FIG. 1 is a block diagram illustrating an example of a configuration of a communication system according to Embodiment 1.

The present invention will be described below with reference to the drawings illustrating an embodiment of a communication system according to the present invention. FIG. 1 is a block diagram illustrating an example of a configuration of a communication system according to Embodiment 1. As illustrated in FIG. 1, a vehicle such as an electric vehicle or a hybrid vehicle and a power feeding device are electrically connected with each other through an inlet 5 (also referred to as "feeding port" or "connector"). The power feeding device includes an AC power supply 6. The AC power supply 6 is electrically connected to a charger 7 in a vehicle through a power line 1 (ACL), and a power line 2 (ACN). The charger 7 is connected to a battery (secondary battery) 8.

Thus, when a plug (not shown) connected to a charge cable extending from the power feeding device is connected to the inlet 5, AC power may be supplied to a vehicle and the battery 8 mounted on a vehicle may be charged.

The communication system according to the present embodiment includes, for example, a communication device 10 installed in a power feeding device and a communication device 50 installed in a vehicle.

The communication device 10 includes an output circuit 20 outputting a rectangular wave signal (also referred to as "control pilot signal") of a predetermined frequency, a communication unit 30, a voltage transformer 31, a low pass filter 33 and the like.

The communication device 50 includes an input circuit 60 to which a control pilot signal is input, a communication unit 70, a voltage transformer 71, a low pass filter 73 and the like.

The output circuit 20 includes a voltage source 21 as a generation unit generating a rectangular wave signal (control pilot signal), a resistance 22, a capacitor 23, a microcomputer 24, a buffer 25 and the like. The voltage source 21 may generate a rectangular wave signal (control pilot signal) with, for example, the frequency of 1 kHz and the peak value of ±12V. The duty ratio of the control pilot signal may be, for example, 20%, but not limited thereto. The rectangular wave signal is a signal with the duty ratio changeable from 0 to 100%, and includes a constant voltage of ±12V. The output circuit 20 sends out a control pilot signal to the input circuit 60 placed in a vehicle through the resistance 22.

The capacitor 23 is provided in order to reduce noise generated at the output circuit 20, for example. Though the value of the resistance 22 may be 1.0 kΩ for example, and the capacitance of the capacitor 23 may be 2.2 nF for example, the numeric values are not limited to the above examples.

The buffer 25 functions as a voltage detection unit detecting a voltage output from the output circuit 20, to detect voltage between both ends, i.e. both-end voltage of the capacitor 23, and to output the result of detection to the microcomputer 24.

The microcomputer 24 functions as an adjustment unit adjusting a rectangular wave signal generated at the voltage source 21. This allows the output circuit 20 to output a constant voltage of ±12V and a rectangular wave signal (control pilot signal) with an arbitrary duty ratio (larger than 0 and smaller than 100) and the crest value of ±12V.

The input circuit 60 includes a capacitor 61, a diode 62, a buffer 63, a microcomputer 64, a resistance unit 65 and the like. The buffer 63 detects both-end voltage Vout of the resistance unit 65 and outputs it to the microcomputer 64. Note that the both-end voltage of the capacitor 61 may also be detected instead of the both-end voltage of the resistance unit 65.

The resistance unit 65 includes a plurality of resistances, switches and the like, and changes (adjusts) the resistance value by opening and closing the switches based on the signals from the microcomputer 64.

The microcomputer 64 functions as an adjustment unit for adjusting the resistance value of the resistance unit 65 in order to change the voltage Vout of the resistance unit 65. In other words, the microcomputer 64 changes the resistance value of the resistance unit 65 in order to change the voltage Vout in accordance with the state of a vehicle (a state related to charging, for example). In accordance with the value of the voltage Vout, the power feeding device and the vehicle are able to detect a state related to charging.

For example, the voltage Vout of 12V indicates a state where the charge plug for the vehicle is unconnected. When the voltage Vout is 9V, the resistance value of the resistance unit 65 is set to 2.74 kΩ and the charge plug of the vehicle is connected, indicating the state of waiting for charge. Furthermore, when the voltage Vout is 6V, the resistance value of the resistance unit 65 is set to 882Ω, indicating the state of being charged. When the voltage Vout is 3V, the resistance value of the resistance unit 65 is set to 246Ω, indicating the state where it is being charged and the place of charging needs to be ventilated.

The capacitor 61 is provided, for example, in order to reduce noise entering the input circuit 60. Though the resistance value of the resistance unit 65 is, for example, approximately 2.74Ω, 882Ω and 246Ω, and the capacitance of the capacitor 61 is, for example, 1.8 nF, the numeric values are not limited to the above examples.

The output circuit 20 and the input circuit 60 are electrically connected with each other through multiple signal lines (control pilot line 4 and ground line 3). It is noted that the ground line 3 may also be regarded as a control pilot line.

The communication units 30 and 70 perform PLC (Power Line Communication) by superimposing a predetermined communication signal onto the control pilot line 4 located between the output circuit 20 and the input circuit 60. The information transmitted and received between the communication units 30 and 70 has more variety than the information transmitted by the control pilot signals, and includes, for example, information related to a vehicle ID, that related to charge control (start, end or the like of charging), that related to management of the amount of charge (notification of charge amount, rapid charging or the like), that related to management of accounting, that related to updating of navigation, and so forth.

The communication units 30 and 70 include, for example, a modulation circuit and a decoding circuit using a modulation scheme such as Orthogonal Frequency Domain Multiplex (OFDM), frequency spreading (SS: Spread Spectrum) and the like.

The communication band for communication performed by the communication units 30 and 70 may be in the range of 2 to 30 MHz (Home Plug Green PHY, for example). It is however not limited thereto and may also be in the range of 150 kHz to 450 kHz (low speed PLC), 1.75 MHz to 1.8 MHz (FSK: frequency shift keying) or the like.

One coil of the voltage transformer 31 is interposed on the control pilot line 4 on the output side of the output circuit 20. The communication unit 30 superimposes a communication signal onto the control pilot line 4 through the voltage transformer 31 while receiving a communication signal on the control pilot line 4.

One coil of the voltage transformer 71 is interposed on the control pilot line 4 on the input side of the input circuit 60. The communication unit 70 superimposes a communication signal onto the control pilot line 4 through the voltage transformer 71 while receiving a communication signal on the control pilot line 4.

In other words, the communication units 30 and 70 perform communication by connecting the voltage transformers 31 and 71 to signal line and superimposing a voltage in series onto the signal line. Such a scheme may be referred to as "on-line scheme."

A low pass filter 33 is interposed on the control pilot line 4 between the output circuit 20 and voltage transformer 31.

Furthermore, a low pass filter 73 is interposed on the control pilot line 4 between the input circuit 60 and the voltage transformer 71.

The low pass filters 33 and 73 are filters allowing rectangular wave signals (control pilot signals) of a predetermined frequency (1 kHz, for example) output by the output circuit 20 to pass through and not allowing communication signals (2 to 30 MHz, for example) transmitted and received by the communication units 30 and 70, respectively, to pass through.

By placing the low pass filter 33 between the communication unit 30 and the output circuit 20 as well as the low pass filter 73 between the communication unit 70 and the input circuit 60, the communication signals transmitted by the communication unit 70 to the communication unit 30 are blocked at the low pass filters 33 and 73 without entering the input circuit 60. Furthermore, the communication signals transmitted from the communication unit 30 to the communication unit 70 are blocked by the low pass filters 33 and 73, not entering the input circuit 60. Accordingly, the voltage level Vout at a predetermined portion of the input circuit 60 is not changed due to communication signals transmitted between the communication units 30 and 70, so that the function of recognizing the state between the power feeding device and the vehicle using the output circuit 20 and the input circuit 60 may be prevented from being lost.

Furthermore, the communication signals transmitted from the communication unit 70 to the communication unit 30 are blocked by the low pass filters 33 and 73 without entering the output circuit 20. Moreover, the communication signals transmitted from the communication unit 30 to the communication unit 70 are blocked by the low pass filters 33 and 73 without entering the output circuit 20. Accordingly, the voltage level of a rectangular wave signal sent out by the output circuit 20 is not changed due to the communication signals transmitted and received between the communication units 30 and 70, so that the function of recognizing the status between the power feeding device and the vehicle using the output circuit 20 and the input circuit 60 may be prevented from being lost.

The low pass filter 33 includes an inductor 331 connected in series with the control pilot line 4 and a capacitor 333 located between the signal lines between the inductor 331 and the voltage transformer 31. Though the inductance of the inductor 331 is 470 µH, for example, it is not limited thereto.

For a predetermined frequency (1 kH, for example) output by the output circuit 20, the inductor 331 has low impedance. On the other hand, the inductor 331 has high impedance for communication signals (2 to 30 MHz, for example) transmitted and received by the communication units 30 and 70. Thus, with a simple configuration, the communication signals transmitted and received by the communication units 30 and 70 are blocked, while control pilot signals may be passed through.

Furthermore, the capacitor 333 between the signal lines has high impedance for a predetermined frequency (1 kHz, for example) of a rectangular wave output by the output circuit 20, and has low impedance for communication signals (2 to 30 MHz) transmitted and received by the communication units 30 and 70. Thus, with a simple configuration, the communication signals transmitted and received by the communication units 30 and 70 are blocked, while control pilot signals may be passed through.

The low pass filter 73 includes an inductor 731 connected in series with the control pilot line 4 and a capacitor 733 located between the signal lines between the inductor 731 and the voltage transformer 71. Though the inductance of the inductor 731 is 470 µH, for example, the inductance is not limited thereto.

For a predetermined frequency (1 kHz, for example) output by the output circuit 20, the inductance 731 has low impedance. On the other hand, the inductor 731 has high impedance for the communication signals (2 to 30 MHz, for example) transmitted and received by the communication units 30 and 70. Accordingly, with a simple configuration, communication signals transmitted and received by the communication units 30 and 70 are blocked while the control pilot signals may be passed through.

Furthermore, the capacitor 733 between the signal lines has high impedance for a predetermined frequency (1 kHz, for example) of a rectangular wave output by the output circuit 20, and has low impedance for communication signals (2 to 30 MHz, for example) transmitted and received by the communication units 30 and 70. Accordingly, with a simple configuration, the communication signals transmitted and received by the communication units 30 and 70 are blocked while the control pilot signals may be passed through.

In addition, the low pass filter 33 includes a resistance 332 connected in parallel with the inductor 331. Though the resistance value of the resistance 332 is 470Ω, for example, it is not limited thereto. The resistance 332 allows the Q factor (Quality factor) representing the sharpness of the peak in oscillation of the oscillation circuit formed between the inductor 331 and the capacitor 23 present in the output circuit 20 to be smaller, suppressing unnecessary oscillation.

Likewise, the low pass filter 73 includes a resistance 732 connected in parallel with the inductor 731. The resistance value of the resistance 732 is 470Ω, for example, it is not limited thereto. The resistance 732 allows, for example, the Q factor (Quality factor) representing the sharpness of the peak in oscillation of the oscillation circuit formed between the inductor 731 and the capacitor 61 or the like present in the input circuit 60 to be smaller, suppressing unnecessary oscillation.

FIG. 2 is an explanatory view illustrating effects on an input circuit by communication signals between communication units 30 and 70 according to Embodiment 1. In FIG. 2, the horizontal axis indicates frequency, whereas the vertical axis indicates a frequency component of voltage at a predetermined portion of the input circuit 60 based on the communication signals between the communication units 30 and 70. The predetermined portion of the input circuit 60 is a portion where the buffer 63 detects a voltage level, indicating a voltage level of the voltage Vout. In FIG. 2, the curve indicated by the reference code A represents the case where the low pass filters 33 and 73 are included, whereas the curve indicated by the reference code B represents the case where the low pass filters 33 and 73 are not included.

As can be seen from FIG. 2, by including the low pass filters 33 and 73, the voltage level at a predetermined portion of the input circuit 60 based on the communication signals between the communication units 30 and 70 is attenuated within the range of 220 kHz to 50 MHz, compared to the case where the low pass filters 33 and 73 are not included. More specifically, the voltage level is attenuated by approximately 20 dB at 2 MHz and approximately 45 dB at 30 MHz, and is attenuated by approximately 20 dB to 45 dB at 2 to 30 MHz which corresponds to the communication bands for the communication units 30 and 70.

By including the low pass filters 33 and 73, the effect of the in-band communication between the communication units 30 and 70 on the output circuit 20 and input circuit 60 is reduced, while the voltage level at a predetermined part of the input circuit 60 is not changed due to the communication signals transmitted and received between the communication units 30 and 70. Thus, the function of recognizing the state between the power feeding device and the vehicle using the output circuit 20 and the input circuit 60 may be prevented from being lost.

In the embodiment above, though the low pass filter is configured by a parallel circuit including an inductor and a resistance, the circuit configuration is not limited thereto but may be configured by an inductor alone or by a serial circuit including an inductor and a resistance. Furthermore, while the signal lines of a control pilot line and a ground line are used as the communication path for the rectangular wave signals or communication signals, a conductor such as a vehicle body or a housing of a power feeding device may be employed for one or both of the signal lines.

Embodiment 2

Figure 3:
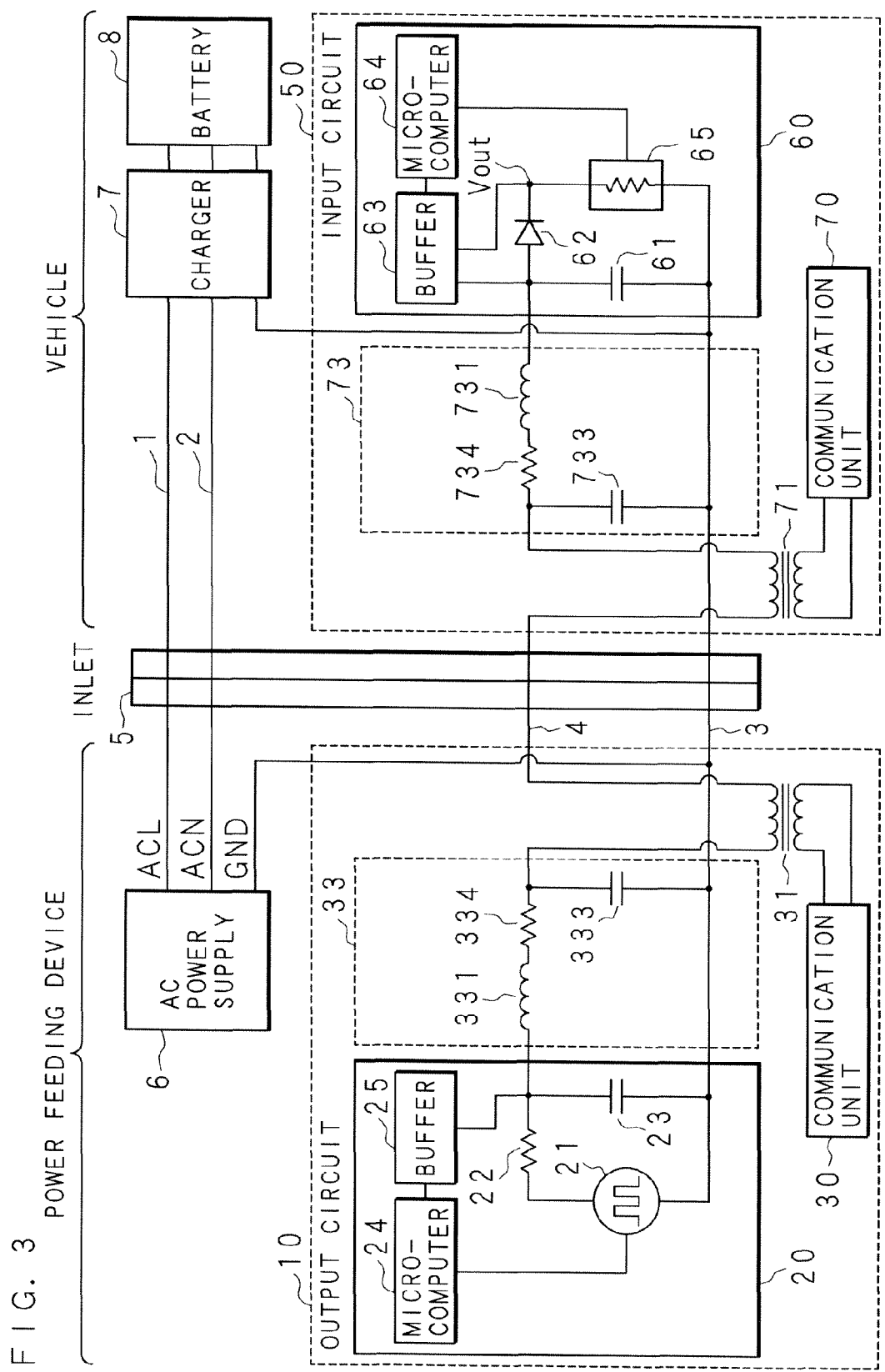
FIG. 3 is a block diagram illustrating an example of a configuration of a communication system according to Embodiment 2.

FIG. 3 is a block diagram illustrating an example of the configuration of a communication system according to Embodiment 2. Embodiment 2 is different from Embodiment 1 in that the low pass filter 33 includes a resistance 334 connected in series with the inductor 331 in place of the resistance 332. The low pass filter 73 similarly includes a resistance 734 connected in series with the inductor 731 in place of the resistance 732. Note that the parts similar to those in Embodiment 1 will be denoted by the same reference codes and will not be described in detail.

The resistance 334 allows, for example, the Q value (Quality factor) representing the sharpness of the peak of oscillation in the oscillation circuit configured between the inductor 331 and the capacitor 23 located in the output circuit 20 to be smaller, thereby suppressing unnecessary oscillation. Further, the resistance 734 allows, for example, the Q value (Quality factor) representing the sharpness of the peak of oscillation in the oscillation circuit configured between the inductor 731 and the capacitor 61 located in the input circuit 60 to be smaller, thereby suppressing unnecessary oscillation.

Embodiment 3

Figure 4:
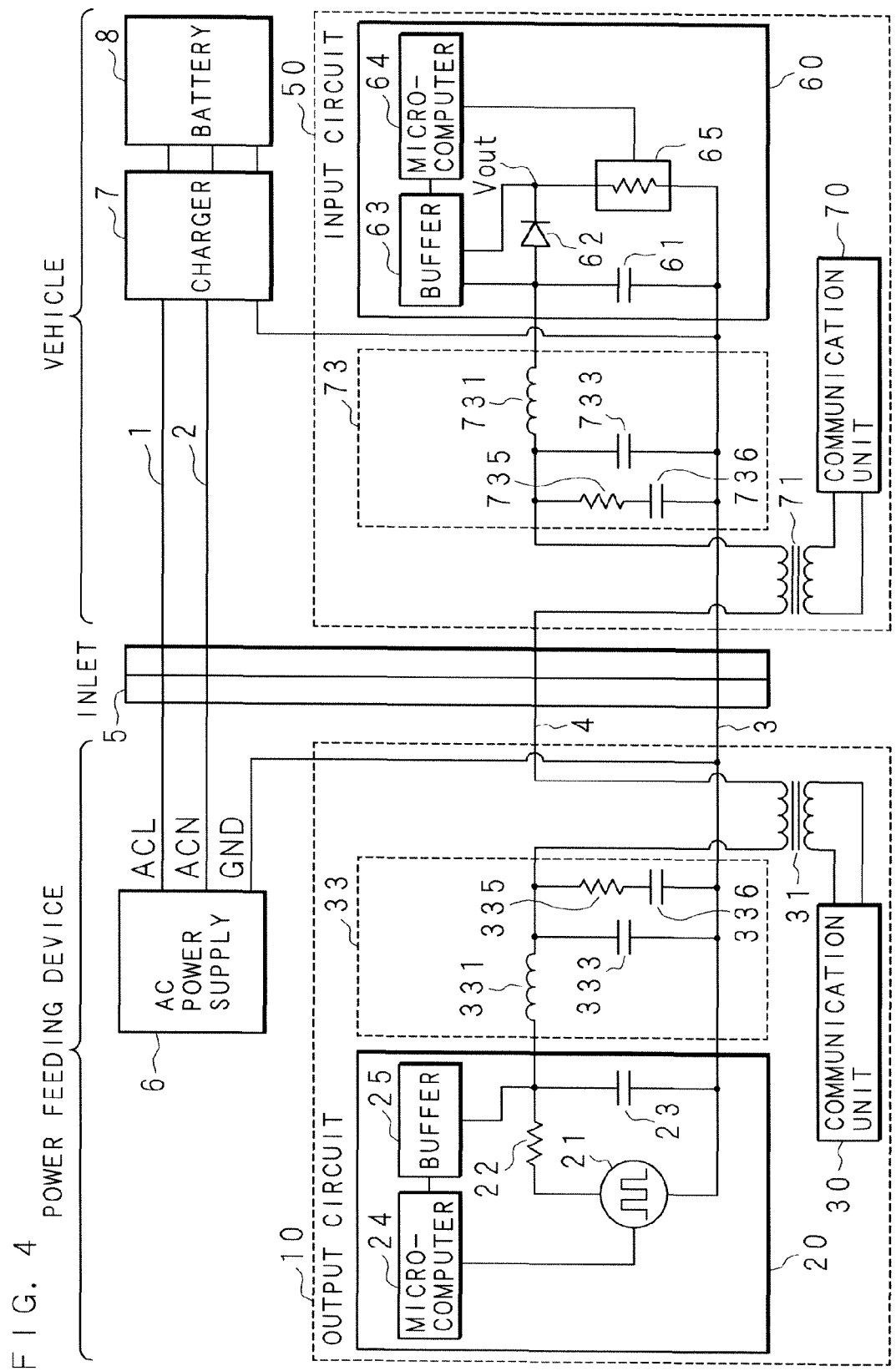
FIG. 4 is a block diagram illustrating an example of a configuration of a communication system according to Embodiment 3.

FIG. 4 is a block diagram illustrating an example of a configuration of a communication system according to Embodiment 3. Embodiment 3 is different from Embodiment 1 in that the low pass filter 33 includes, in place of the resistance 332, a serial circuit of a capacitor 336 and a resistance 335 connected between the control pilot line 4 and the ground line 3. The low pass filter 73 similarly includes, in place of the resistance 732, a serial circuit of a capacitor 736 and a resistance 735 connected between the control pilot line 4 and the ground line 3.

As described above, the low pass filter 73 includes a serial circuit of the capacitor 736 and the resistance 735 between the signal lines between the inductor 731 and the voltage transformer 71, while the low pass filter 33 includes a serial circuit of the capacitor 336 and the resistance 335 between the signal lines between the inductor 331 and the voltage transformer 31. Moreover, the parts similar to those in Embodiment 1 will be denoted by the same reference codes and will not be described in detail.

Accordingly, the capacitor between the signal lines has high impedance for a predetermined frequency (1 kHz, for example) of the rectangular wave output by the output circuit 20, and has low impedance for a communication signal (2-30 MHz, for example) transmitted and received by the communication units 30 and 70. This allows the communication signals transmitted and received by the communication units 30 and 70 to be blocked and control pilot signals to pass through with a simple configuration.

In the embodiment described above, the low pass filter 33 is provided between the output circuit 20 and the communication unit 30 and the low pass filter 73 is provided between the input circuit 60 and the communication circuit 70. The configuration is, however, not limited thereto, but may have such a configuration that the low pass filter 73 is included between the input circuit 60 and the communication circuit 70 while no low pass filter 33 is included. Nevertheless, inclusion of both the low pass filters 33 and 73 may further reliably prevent the loss of the function of recognizing the state between a power feeding device and a vehicle using the output circuit 20 and the input circuit 60.

The present embodiment may be applied to Home Plug Green PHY with the communication band in the range of 2 to 30 MHz, though not limited thereto. The present embodiment may also be applied to low-speed PLC with the communication band in the range of 150 kHz to 450 kHz, FSK (Frequency Shift Keying) with the communication band in the range of 1.75 MHz to 1.8 MHz and the like.

The embodiments disclosed herein are to be considered as illustrative, not as restrictive, in all aspects. The scope of the present invention is defined by the appended claims rather than by the description preceding them, and all changes that fall within metes and bounds of the claims, or equivalence of such metes and bounds thereof are therefore intended to be embraced by the claims.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A communication system including an output circuit provided in a power feeding device for feeding power to a vehicle and outputting a rectangular wave signal of a predetermined frequency, and an input circuit provided in the vehicle and connected with the output circuit through a plurality of signal lines, the rectangular wave signal output by the output circuit being input to the input circuit through the plurality of signal lines, the communication system performing communication between the vehicle and the power feeding device by transmitting both a communication signal and the rectangular wave signal on the signal lines, the communication system comprising:
    a first communication unit provided in the vehicle and performing transmission and reception of a communication signal, different from the rectangular wave signal, through a first voltage transformer interposed in a midway of the signal line;
    a second communication unit provided in the power feeding device and performing transmission and reception of a communication signal, different from the rectangular wave signal, through a second voltage transformer interposed in a midway of the signal line; and
    a first low pass filter interposed between the input circuit and the first voltage transformer to allow the rectangular wave signal to pass through as a rectangular wave signal and not to allow the communication signal to pass through.

2. The communication system according to claim 1, further comprising a second low pass filter interposed between the output circuit and the second voltage transformer to allow the rectangular wave signal to pass through as a rectangular wave signal and not to allow the communication signal to pass through.

3. The communication system according to claim 1, wherein
    the first low pass filter includes:
    a first inductor connected in series with the signal line; and
    a capacitor connected between signal lines between the first inductor and the first voltage transformer.

4. The communication system according to claim 2, wherein
    the second low pass filter includes:
    a second inductor connected in series with the signal line; and
    a capacitor connected between signal lines between the second inductor and the second voltage transformer.

5. The communication system according to claim 3, wherein
    the first low pass filter includes a resistance connected in parallel with the first inductor.

6. The communication system according to claim 4, wherein
    the second low pass filter includes a resistance connected in parallel with the second inductor.

7. The communication system according to claim 3, wherein
    the first low pass filter includes a resistance connected in series with the first inductor.

8. The communication system according to claim 4, wherein
    the second low pass filter includes a resistance connected in series with the second inductor.

9. The communication system according to claim 3, wherein
    the first low pass filter includes a resistance connected in series with a capacitor.

10. The communication system according to claim 4, wherein
    the second low pass filter includes a resistance connected in series with a capacitor.

11. A communication device including an output circuit outputting a rectangular wave signal of a predetermined frequency through a plurality of signal lines, comprising:
    a communication unit performing transmission and reception of a communication signal, different from the rectangular wave signal, by transmitting both the communication signal and the rectangular wave signal on the signal lines through a voltage transformer interposed in a midway of the signal line; and
    a low pass filter interposed between the output circuit and the voltage transformer to allow the rectangular wave signal to pass through as a rectangular wave signal and not to allow the communication signal to pass through.

12. The communication device according to claim 11, further comprising:
   a generation unit generating the rectangular wave signal;
   a voltage detection unit detecting an output voltage of the output circuit; and
   an adjustment unit adjusting a rectangular wave signal generated by the generation unit in accordance with the voltage detected by the voltage detection unit.

13. A communication device, including an input circuit to which a rectangular wave signal of a predetermined frequency is input through a plurality of signal lines, comprising:
   a communication unit performing transmission and reception of a communication signal, different from the rectangular wave signal, by transmitting both the communication signal and the rectangular wave signal on the signal lines through a voltage transformer interposed in a midway of the signal line; and
   a low pass filter interposed between the input circuit and the voltage transformer to allow the rectangular wave signal to pass through as a rectangular wave signal and not to allow the communication signal to pass through.

14. The communication device according to claim 13, further comprising:
   a resistance unit having a plurality of resistances and capable of adjusting a resistance value; and
   an adjustment unit adjusting a resistance value of the resistance unit so as to change a voltage of the resistance unit.

* * * * *